United States Patent [19]
Naini et al.

[11] Patent Number: 5,265,043
[45] Date of Patent: Nov. 23, 1993

[54] WALLACE TREE MULTIPLIER ARRAY HAVING AN IMPROVED LAYOUT TOPOLOGY

[75] Inventors: Ajay Naini; William C. Anderson, both of Austin; Lisa J. Craft, Richardson, all of Tex.

[73] Assignee: Motorola, Inc., Schaumburg, Ill.

[21] Appl. No.: 9,435

[22] Filed: Jan. 27, 1993

Related U.S. Application Data

[63] Continuation of Ser. No. 811,725, Dec. 23, 1991, abandoned.

[51] Int. Cl.$^5$ .............................................. G06F 7/52
[52] U.S. Cl. ..................................... 364/757; 364/759
[58] Field of Search ......................... 364/757, 754, 759

[56] References Cited

U.S. PATENT DOCUMENTS

| | | | |
|---|---|---|---|
| 4,594,679 | 6/1986 | George et al. | 364/754 |
| 4,594,680 | 6/1986 | Schomburg et al. | 364/757 X |
| 4,843,585 | 6/1989 | Williams | 364/759 |

OTHER PUBLICATIONS

"High-Speed Monolithic Multipliers for Real-Time Digital Signal Processing," written by Shlomo Waser and published in IEEE Computer in Oct. 1978, pp. 19-29.

*Primary Examiner*—Tan V. Mai
*Attorney, Agent, or Firm*—Charlotte B. Whitaker

[57] ABSTRACT

A Wallace tree multiplier array (40) performs multiply operations using operands received via a data path (42) having a predetermined height. Rows of carry save adders (CSAs 15'-19") add sets of partial products to generate sets of intermediate summands, which are recursively added to generate a set of final summands. A first group of CSAs form a column which is placed along an axis parallel to the data path (42), and are used to compute a more significant number of bits of each of the summands. The column height of the first group of CSAs is equal to and aligned with the height of the data path (42). A second group of CSAs are placed along an axis perpendicular to the column formed by the first group of CSAs, thereby minimizing the dimension of the multiplier along the data path. The second group of CSAs compute a less significant number of bits of the summands.

12 Claims, 4 Drawing Sheets

FIG.1 —PRIOR ART—

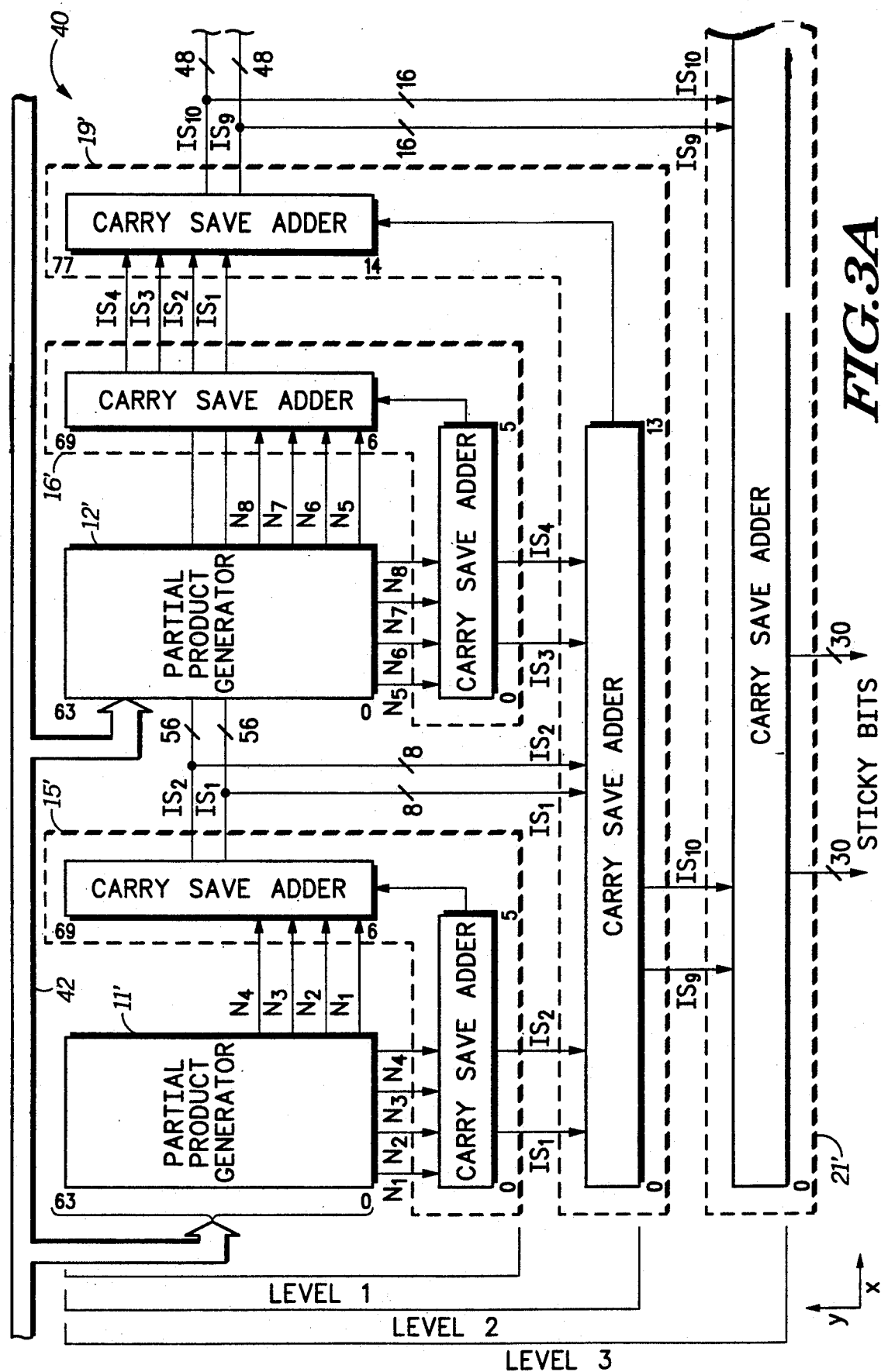

WALLACE TREE MULTIPLIER ARRAY HAVING AN IMPROVED LAYOUT TOPOLOGY

This application is a continuation of prior application Ser. NO. 07/811,725 filed Dec. 23, 1991 now abandoned.

FIELD OF THE INVENTION

This invention relates generally to data processing systems, and more particularly to a layout topology of a multiplier array for use in data processing systems.

BACKGROUND OF THE INVENTION

Today's high performance microprocessors must have the capability of supporting fast floating point and integer calculations. In order to support various applications environments (i.e. graphics image rendering) these microprocessors must perform multiply operations, using operands that have a 32 or 64-bit word length, at high clock rates. Typically, these microprocessors rely upon multiplier arrays to perform a set of floating point, integer and graphic multiply instructions. Generally, the number of circuit elements in a multiplier is proportional to $N^2$ (where N is the word length in bits). Thus, one critical factor affecting implementation of a multiplier is the global layout considerations ("floorplan") of the circuit elements. Another critical factor is the speed at which the multiplier performs the multiply operation.

Since tree multipliers have a delay proportional to log(N), they are preferable in terms of performance to array multipliers, whose delay is proportional to N. Tree multipliers require large shifts of data perpendicular to the data path, therefore, implementation of tree multipliers is routing intensive. Thus, even though tree multipliers offer speed advantages over array multipliers, microprocessor designers have traditionally avoided using tree multipliers due to the circuit area required for their implementation.

It is, therefore, desirable to provide a tree multiplier floorplan which reduces the circuit area required for its implementation, while still providing the capability to perform high speed calculations.

SUMMARY OF THE INVENTION

A Wallace tree multiplier array is coupled to a data path and performs multiply operations using operands received via the data path. Booth-encoded partial product generators receive a first operand representing a multiplier, and a second operand representing a multiplicand, and generate a predetermined set of partial product. Rows of carry save adders, connected to the Booth-encoded partial product generators, add a predetermined number of partial products to thereby generate sets of intermediate summands.

The intermediate summands are recursively added to generate a set of final summands. A first set of carry save adders compute a more significant number of bits of each of said set of intermediate summands and said set of final summands. The first set of adders form a column which is placed along the data path. The column height of the first set of adders is equal to and aligned by bit position with the height of the data path. A second set of carry save adders computes a less significant number of "sticky bits" of the set of intermediate summands and the set of final summands. The second set of adders are folded along an axis perpendicular to the column formed by the first set of adders, thereby forming a row of adders perpendicular to the data path.

BRIEF DESCRIPTION OF THE DRAWINGS

FIGS. 3A-B illustrate in block diagram form a multiple inverse L-fold layout floorplan for a Booth-encoded Wallace tree multiplier array, in accordance with a preferred embodiment of the present invention.

DESCRIPTION OF A PREFERRED EMBODIMENT

Figure 1:
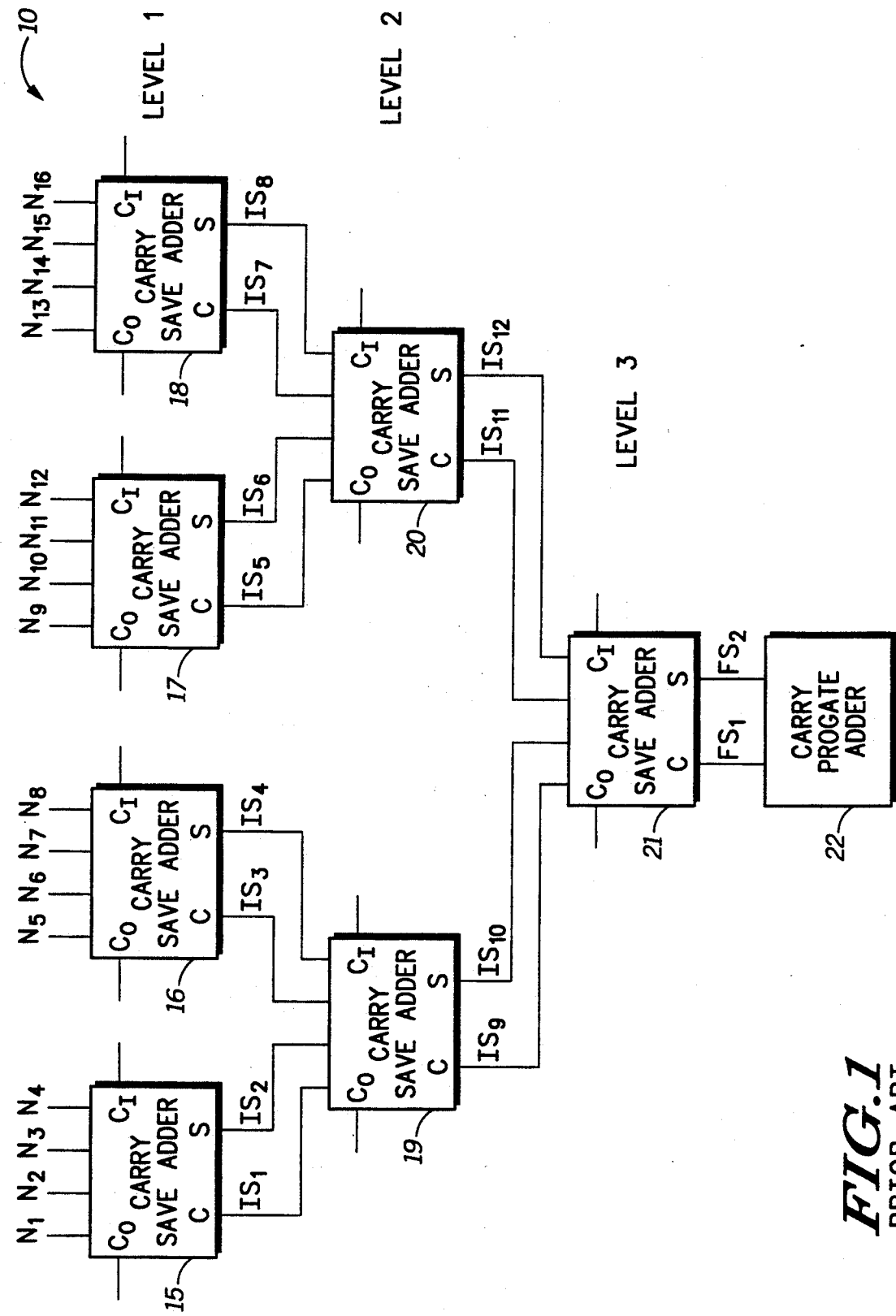
FIG. 1 illustrates in block diagram form a prior art structure of a Wallace tree multiplier array.

In a data processing system, multiplication operations may be performed at higher speeds by increasing the speed at which partial products are added recursively to generate the final product. Essentially, an n-bit multiplicand is multiplied by an m-bit multiplier, and m/2 partial products are generated. Booth-encoding is used to reduce the number of partial products to m/2. The m/2 partial products are then used by the data processor to generate a final product (result). Shown in FIG. 1 is a block diagram illustrating the structure of a conventional Wallace tree multiplier array 10. A Wallace tree is an interconnection of carry-save adders (CSAs) that reduces m/2 partial products to two operands. Generally, these partial products (N) are viewed as adjacent columns of equal-weight bits. The Wallace tree multiplier array 10 of FIG. 1 is a 16×64-bit Booth-encoded tree array structure. The CSAs blocks 15-21 shown in FIG. 1 represent rows of carry save adders, each of which reduces four bits of equal weight to two bits, one a sum (S) and the other a carry (C), which is hereinafter referred to as a 4×2 CSA.

Figure 2:
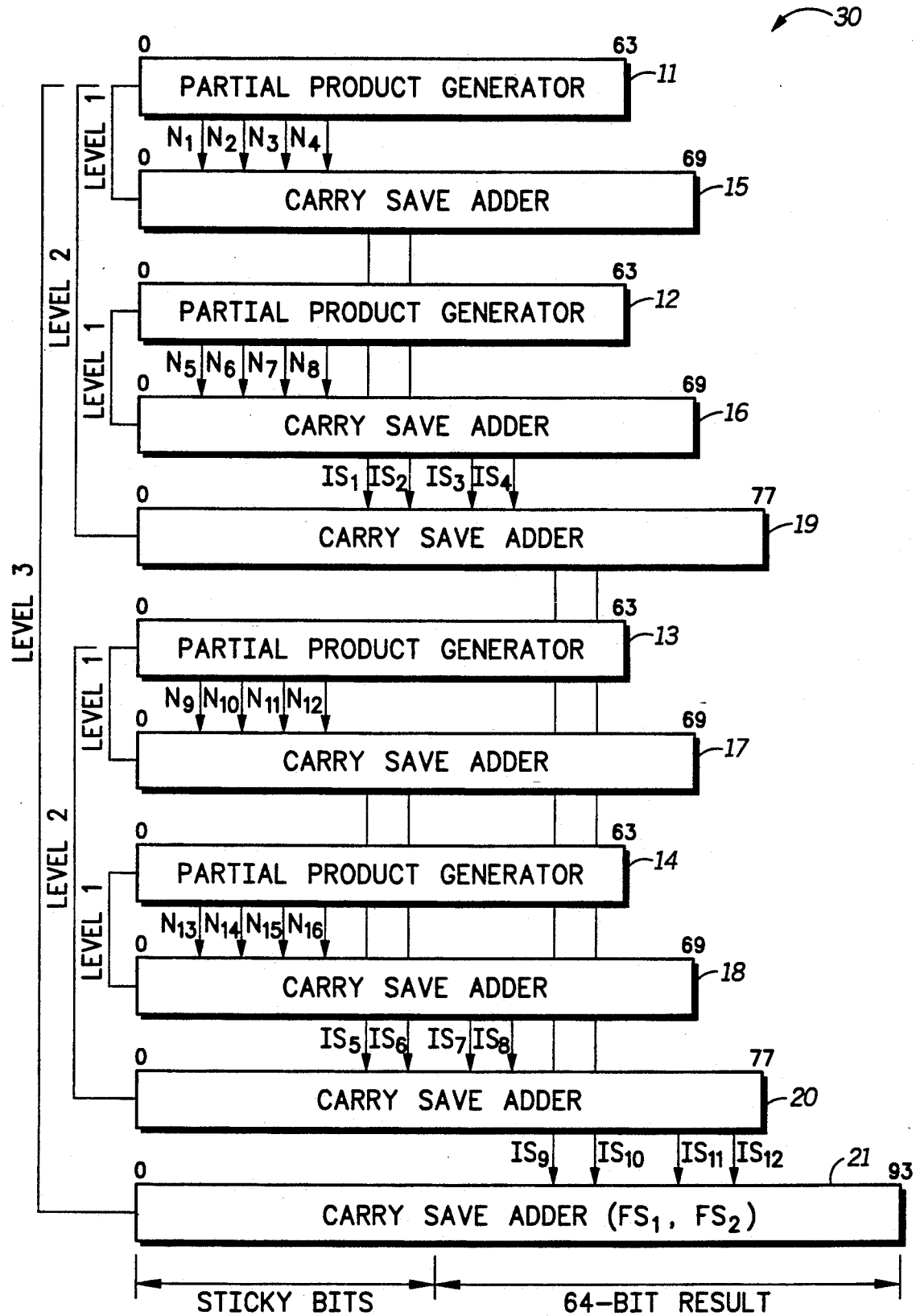
FIG. 2 illustrates in block diagram form a prior art layout floorplan of a Booth-encoded Wallace tree multiplier array.

Shown in FIG. 2 is a block diagram illustrating the floorplan 30 of a conventional Booth-encoded Wallace tree multiplier 30. In FIG. 2, analogous elements are numbered identically with FIG. 1. In the 32×64 multiplication, 16 Booth-encoded partial products ($N_1$–$N_{16}$) are generated by the partial product generators 11-14. A first set of partial product generators 11 and 12 generate four partial products each ($N_1$–$N_4$), and ($N_5$–$N_8$), respectively. The set of first level CSAs 15 and 16 accepts the four partial products ($N_1$–$N_4$), and ($N_5$–$N_8$), and each generates two intermediate summands ($IS_1$–$IS_2$) and ($IS_3$–$IS_4$), respectively, as outputs. Each intermediate summand is 70-bits in length, which is hereinafter referred to as "column" height, which represents a dimension along the Y-axis. Similarly, a second set of partial generators 13 and 14 generate four partial products each ($N_9$–$N_{12}$) and ($N_{13}$–$N_{16}$), respectively. Another set of first level CSAs 17-18 accepts the four partial products ($N_9$–$N_{12}$) and ($N_{13}$–$N_{16}$), respectively, and each generates two intermediate summands ($IS_5$–$IS_6$) and ($IS_7$–$IS_8$), respectively. As previously indicated, each intermediate summand is 70-bits in length. Thus, each of the first level CSAs 15-18 requires seventy rows of CSAs to generate the 70-bit intermediate summands.

As shown in FIG. 2, each of the second level CSAs 19 and 20 accepts the previous four intermediate summands ($IS_1$–$IS_4$), and ($IS_5$–$IS_8$), respectively, and each generates a set of level two intermediate summands ($IS_9$–$IS_{10}$) and ($IS_{11}$–$IS_{12}$), respectively, which are each 78-bit in length. Accordingly, each of the second level intermediate summands require seventy-eight rows of CSAs. This procedure continues until the third level CSA 21 generates the two final summands ($FS_1$ and $FS_2$), which are each 94-bits in length, and require 94 rows of CSAs. The most significant 64-bits of the two final summands are the final result, whereas, the least significant 30-bits are "sticky bits". A carry propagate adder 22 (FIG. 1) is then used to obtain the final result.

The structure of the conventional Wallace tree multiplier array 30, shown in FIG. 2, is irregular. Essentially, the multiplication operation begins with the height of the data path being 64-bits; however, the height of the final result increases to 94-bits, during the performance of the multiplication operation. Thus, the cell height of the final result extends approximately 45% beyond that the data path height, and therefore, requires additional layout area. Essentially, in the conventional Wallace tree multiplier array 10, the most significant bits (MSBs) of the final result are misaligned, in the y-direction, with the MSBs of the data path. Thus, it is necessary to downshift the MSB of the final result to align them with the data path. The routing channels required for performing the downshift operation also increases the area required to layout the multiplier array 30. Thus, due to the irregularity of the Wallace tree multiplier array 10 additional layout area is required.

Figure 3B:
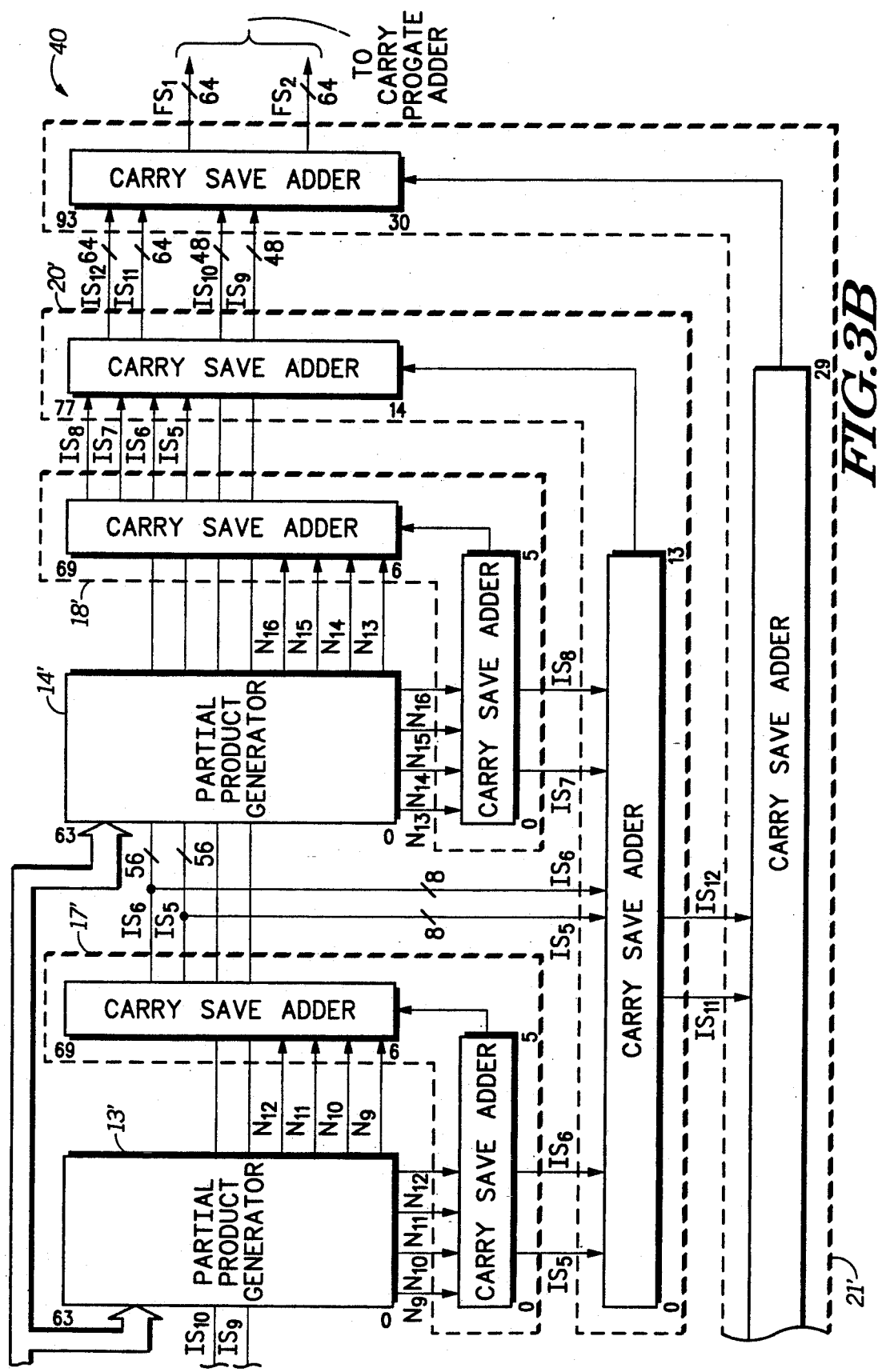

Shown in FIGS. 3A and 3B, is a block diagram illustrating a multiple inverse L-fold layout floorplan for a Booth-encoded Wallace tree multiplier array 40, in accordance with a preferred embodiment of the present invention. In the preferred embodiment, the Wallace tree multiplier array 40 is a 32×64-bit tree array structure which uses 4×2 carry save adders (CSA) 15'-21'. In the preferred embodiment, the Wallace tree multiplier array 40 is connected to a 64-bit data bus, hereinafter referred to as data path 42, which provides the multiplier and multiplicand operands to the multiplier array 40. Thus, the height of the data path 42 is 64-bits.

In the preferred embodiment, the multiplier array 40 uses Booth partial product generators 11'-14' and a Wallace tree 10 (FIG. 1) to generate and sum the partial products. As shown in FIGS. 3A and 3B, each of the partial product generators 11'-14' provide four partial products to first level CSAs 15'-18'. In the first level of the Wallace tree, CSA 15' accepts four partial products ($N_1$-$N_4$) generated by partial product generator 11', and generates two intermediate summands $IS_1$ and $IS_2$ as outputs. Similarly, CSA 16' accepts four partial products ($N_5$-$N_8$) generated by partial product generator 12', and generates two intermediate summands $IS_3$ and $IS_4$ as outputs. Likewise, CSA 17' accepts four partial products ($N_9$-$N_{12}$) generated by partial product generator 13', and generates intermediate summands $IS_5$ and $IS_6$. In the same manner, CSA 18' generates two intermediate summands $IS_7$ and $IS_8$ using the four partial products ($N_{13}$-$N_{16}$) generated by partial product generator 14'.

As previously indicated, each of the intermediate summands ($IS_1$-$IS_8$) will be 70-bits in length, and therefore, each will require seventy rows of CSAs. In the present invention, of the seventy CSAs required to generate each intermediate summands, the most significant sixty-four CSAs (bits 6-69) are placed along the 64-bit data path 42 (Y-axis), while the least significant six CSAs (bits 0-5) are placed along the X-axis, as shown in FIGS. 3A and 3B. Thus, both the height of the data path 42 and the height of the CSA column along the Y-axis are 64-bits, and the most significant bits of the intermediate summands ($IS_1$-$IS_8$) are aligned with the data path 42.

Each of the second level CSAs 19' and 20' accepts first level intermediate summands ($IS_1$-$IS_4$), and ($IS_5$-$IS_8$), respectively, and each generates the second level intermediate summands ($IS_9$ and $IS_{10}$) and ($IS_{11}$ and $IS_{12}$), respectively, as shown in FIGS. 3A and 3B. As previously indicated, the second level intermediate summands are each 78-bits in length, and therefore, each will require seventy-eight rows of carry save adders. In accordance with the present invention, of the seventy-eight CSAs required to generate each of the intermediate results ($IS_9$-$IS_{12}$), the most significant sixty-four CSAs (bits 14-77) are placed along the 64-bit data path 42, while the least significant fourteen CSAs (bits 0-13) are placed along the Y-axis. Thus, the MSBs of the second level intermediate summand bits are also aligned with the data path 42.

The third level CSA 21' accepts the second level intermediate summands ($IS_9$-$IS_{12}$) generated by the second level CSAs 19' and 20', and generates two final summands ($FS_1$ and $FS_2$), which are each 94-bits in length. In the present invention, of the ninety-four CSAs required to generate each of the final summands $FS_1$ and $FS_2$, the most significant sixty-four CSA (bits 30-93) are placed along the 64-bit data path 42, while the least significant thirty CSAs (bits 0-29) are placed along the Y-axis. At each level, the floorplan of the Wallace tree multiplier array 40 limits the column height of the results (e.g. intermediate and final summands) to be the same height as the data path 42. Thus, in the present invention, the height of the most significant CSAs, at every level, will always be the same as that of the data path 42, while the least significant bits CSAs will be folded along the X-axis. Although in the present invention, the least significant CSAs are extended along the X-axis, the area required for this extension (approximately 22% in the Y-direction) is significantly less than the 45% extension required in the conventional Wallace tree multiplier array 30 (FIG. 2).

As shown in FIGS. 3A and 3B, each of the first level intermediate summands $IS_1$-$IS_2$, and $IS_5$-$IS_6$ are shifted eight bit positions to align with intermediate summands $IS_3$-$IS_4$ and $IS_7$-$IS_8$, respectively. Furthermore, the second level intermediate summand $IS_9$ and $IS_{10}$ are shifted sixteen bit positions to align with intermediate summands $IS_{11}$ and $IS_{12}$, respectively. The routing channels required to perform the shifting operations are also required, although not shown, in the conventional Booth-encoded Wallace tree multiplier 30 (FIG. 2). However, in the present invention, only these thirty-two routing channels are required to align the MSBs of the intermediate summands with the data path 42. In contrast, the conventional Booth-encoded Wallace tree multiplier 30 requires these thirty-two routing channels plus thirty-two more channels to align the final result with the height of the data path.

Thus, in the present invention, the "L-fold" layout of CSAs 15'-21' is used to keep the dimension of the multiplier along the data path 42 (Y-axis) to a minimum and to avoid unnecessary routing for the alignment of data. Accordingly, the "L-fold" design serves to keep the data of the proper significant (MSBs) aligned in the data path 42, while routing the data used for "sticky bit" calculation out of the data path 42. The result is a logical and orderly layout for a Wallace tree multiplier which reduces circuit area. The layout of the Wallace tree array 40 is designed to insure that the most significant bits of each result (intermediate or final summands) generated by the carry save adders 15'-21' is aligned to be the same height as that of the data path 42. Accordingly, in the present invention, the most significant CSAs are placed along the data path 42 (Y-axis), and the least significant bits are down shifted and placed along the bottom side (X-axis) of the data path 42. Essentially, multiple "L folds" are used to effectively place the least significant CSAs. Thus, the number of routing channels required for shifting the results is reduced.

While the present invention has been described in accordance with a preferred embodiment, it should be apparent to one of ordinary skill in the art that the invention may be practiced in numerous ways. For example, the Wallace tree structure 10 may be implemented with 3×2 CSAs (three inputs and two outputs). Furthermore, the partial products generated by the partial product generators 11'-14' need not be Booth-encoded. Accordingly, it is intended by the appended claims to cover all modifications of the invention which fall within the true spirit and scope of the invention.

We claim:

1. A multiplier array having columns and rows, where each column has a height comprised of a predetermined number of bit positions and each row has a length comprised of a predetermined number of bit positions, said multiplier array, coupled to a data path having a column height equal in number of bit positions to the column height of the multiplier array, said multiplier array receiving a plurality of operands via said data path and using said plurality of operands to perform a multiplication operation, said multiply array comprising:

first means for generating a predetermined set of partial products, said first means using a first operand representing a multiplier, and a second operand representing a multiplicand; and second means coupled to said first means for receiving said set of partial products and for adding said set of partial products to generate a set of intermediate summands, said second means adding said intermediate summands to generate a set of final summands, said second means comprising a predetermined number of carry save adders interconnected to form a Wallace tree structure having an L-fold layout, comprising:

a first set of carry save adders for computing a more significant number of bits of each of said set of intermediate summands and said set of final summands, said first set of adders forming a column along said data path, said first set of adders being placed along said data path and having an adder column height which is equal to and aligned with by bit position said column height of said data path; and a second set of carry save adders for computing a less significant number of bits of said set of intermediate summands and said set of final summands, said second set of adders being placed along an axis perpendicular to the column formed by the first set of adders to thereby form a row of adders perpendicular to the data path.

2. The multiplier array of claim 1 further comprising a carry propagate adder coupled to said second means for generating a final result of said multiplication operation by adding said set of final summands.

3. The multiplier array of claim 1 wherein said first means comprises a set of Booth-encoded partial product generators.

4. The multiplier array of claim 1 wherein said L-fold layout of said second means aligns, by bit positions, said more significant number of bits of said set of intermediate summands and said set of final summands with said data path, and routes said less significant number of bits of each set of summands out of said data path to calculate a set of sticky bits.

5. A Wallace tree multiplier array having columns and rows, where each column has a height of a predetermined number of bits positions and each row has a length comprised of a predetermined number of bits positions, said Wallace tree multiplier array, coupled to a data path having a height equal in number of bit positions to the column height of the Wallace tree multiplier array, for receiving a plurality of operands via said data path and for using said plurality of operands to perform a multiplication operation, said Wallace tree multiply array comprising:

partial product generator means for using a first operand representing a multiplier and a second operand representing a multiplicand to generate a predetermined set of partial products; and adder means coupled to said partial product generator means for receiving said set of partial products and for adding said set of partial products to generate a set of intermediate summands, said adder means adding said intermediate summands to generate a set of final summands, said adder means interconnected to form a Wallace tree structure having an L-fold layout of carry save adders, said L-fold layout of said adder means comprising:

a first set of carry save adders for computing a more significant number of bits of each of said set of intermediate summands and said set of final summands, said first set of carry save adders forming a column along a first axis parallel to said data path, and said first set of adders having an adder column height which is equal to and aligned by bit position with the height of said data path; and a second set of carry save adders for computing a less significant number of bits of said set of intermediate summands and said set of final summands, said second set of carry save adders being aligned along a second axis perpendicular to the column formed by the first set of adders, said second set of adders forming a row of adders perpendicular to the height of said data path.

6. The Wallace tree multiplier array of claim 5 further comprising a carry propagate adder coupled to said adder means for adding said set of final summands to thereby generate a final result of said multiplication operation.

7. The Wallace tree multiplier array of claim 5 wherein said partial product generator means comprises a set of Booth-encoded partial product generators.

8. The Wallace tree multiplier array of claim 5 wherein said L-fold layout of said adder means reduces a layout dimension of said multiply array along the data path, while avoiding unnecessary routing for alignment of said more significant number of bits of said set of intermediate summands and said set of final summands on said data path.

9. A Wallace tree multiplier array having columns and and rows, where each column has a height of a predetermined number of bit positions coupled to a data path having a height equal in number of bit positions to the column height of the Wallace tree multiplier, said Wallace tree multiplier array receiving a plurality of operands and using said plurality of operands to perform a multiplication operation, said multiplier array comprising:

first means for generating a predetermined set of partial products said first means using a first operand representing a multiplier, and a second operand representing a multiplicand; and second means coupled to said first means for receiving said set of partial products and for adding said set of partial products to generate a set of intermediate summands, said second means adding said intermediate summands, and shifting said intermediate summands to generate a set of final summands, said second means having an L-fold layout of carry save adders for properly aligning by bit position a predetermined number of more significant bits of said intermediate summands and said final summands onto said data path, while routing a less significant number of bits of said intermediate summands and said final summands, used for a sticky bit calculation, out of said data path, said L-fold layout of carry save adders comprising:

a first set of carry save adders for computing said predetermined number of more significant bits of each of said set of intermediate summands and said set of final summands, said first set of carry save adders forming a column along said data path, wherein said first set of carry save adders has a column height which is equal to and aligned by bit position with the height of said data path; and a second set of carry save adders for computing said less significant number of bits of said set of intermediate summands and said set of final summands, aid second set of carry save adders being folded along an axis perpendicular to the column formed by the first set of adders to thereby form a row of adders perpendicular to the height of said data path.

10. The Wallace tree multiplier array of claim 9 further comprising a carry propagate adder coupled to said second means for adding said final set of summands to generate a final result of said multiplication operation.

11. The Wallace tree multiplier array of claim 9 wherein said first means comprises a set of Booth-encoded partial product generators.

12. The Wallace tree multiplier array of claim 9 wherein said L-fold layout of said second means reduces a layout dimension of said multiply array along the data path, while avoiding unnecessary routing for alignment of said more significant number of bits of said set of intermediate summands and said set of final summands on said data path.

* * * * *

UNITED STATES PATENT AND TRADEMARK OFFICE
CERTIFICATE OF CORRECTION

PATENT NO. : 5,265,043
DATED : November 23, 1993
INVENTOR(S) : Ajay Naini, et al.

It is certified that error appears in the above-indentified patent and that said Letters Patent is hereby corrected as shown below:

Column 8, line 10, change "aid" to --said--

Signed and Sealed this

Ninth Day of August, 1994

Attest:

BRUCE LEHMAN

Attesting Officer

Commissioner of Patents and Trademarks